(12) United States Patent
Gaurav et al.

(10) Patent No.: US 7,685,208 B2
(45) Date of Patent: Mar. 23, 2010

(54) XML PAYLOAD SPECIFICATION FOR MODELING EDI SCHEMAS

(75) Inventors: Suraj Gaurav, Issaquah, WA (US); Surendra Machiraju, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 172 days.

(21) Appl. No.: 11/361,263

(22) Filed: Feb. 24, 2006

(65) Prior Publication Data

US 2007/0204214 A1 Aug. 30, 2007

(51) Int. Cl.
*G06F 7/00* (2006.01)

(52) U.S. Cl. .................. 707/802; 715/234; 715/513

(58) Field of Classification Search .................. None
See application file for complete search history.

(56) References Cited

U.S. PATENT DOCUMENTS

| | | | |
|---|---|---|---|
| 4,729,096 A | 3/1988 | Larson | |
| 4,787,035 A | 11/1988 | Bourne | |
| 4,860,203 A | 8/1989 | Corrigan et al. | |
| 4,951,196 A | 8/1990 | Jackson | |
| 5,202,977 A | 4/1993 | Pasetes, Jr. et al. | |
| 5,878,419 A | 3/1999 | Carter | |
| 5,897,645 A | 4/1999 | Watters | |
| 5,915,259 A | 6/1999 | Murata | |
| 6,101,556 A | 8/2000 | Piskiel et al. | |
| 6,256,667 B1 | 7/2001 | Wahlander et al. | |
| 6,302,326 B1 | 10/2001 | Symonds et al. | |
| 6,377,953 B1 * | 4/2002 | Gawlick et al. | 707/102 |
| 6,418,400 B1 | 7/2002 | Webber | |
| 6,442,569 B1 | 8/2002 | Crapo et al. | |
| 6,591,260 B1 | 7/2003 | Schwarzhoff et al. | |
| 6,609,200 B2 | 8/2003 | Anderson et al. | |
| 6,687,873 B1 | 2/2004 | Ballantyne et al. | |
| 6,735,598 B1 | 5/2004 | Srivastava | |
| 6,772,180 B1 | 8/2004 | Li et al. | |
| 6,785,689 B1 * | 8/2004 | Daniel et al. | 707/102 |
| 7,051,072 B2 | 5/2006 | Stewart et al. | |
| 7,249,157 B2 | 7/2007 | Stewart et al. | |

(Continued)

FOREIGN PATENT DOCUMENTS

KR 1020020054248 A 6/2002

(Continued)

OTHER PUBLICATIONS

Unknown, "4.0 Emerging Industry Frameworks/Repositories," http://www.dcnicn.com/XMLEDICentral/CDRL/HTML/Drafttask3delArpt/Drafttask3delArp1-05.htm, printed on Jan. 21, 2006, 48 pages, USA.

(Continued)

*Primary Examiner*—Etienne P LeRoux
*Assistant Examiner*—Thu Nga Nguyen
(74) *Attorney, Agent, or Firm*—Senniger Powers LLP

(57) ABSTRACT

Modeling an electronic data interchange (EDI) document using extensible Markup Language (XML) at runtime. A plurality of structural elements is identified in the EDI document. A plurality of corresponding data values is identified from the identified plurality of structural elements in the EDI document. A plurality of annotations is generated for a plurality of rules included in the EDI document. The plurality of rules defines operations associated with the plurality of corresponding data values. The determined data values and the generated annotated is transformed into an XML schema corresponding to the EDI document. The XML schema is processed at runtime.

18 Claims, 6 Drawing Sheets

U.S. PATENT DOCUMENTS

| | | | |
|---|---|---|---|
| 7,281,211 B2 * | 10/2007 | Jeannette et al. | 715/234 |
| 2001/0018697 A1 | 8/2001 | Kunitake et al. | |
| 2001/0049743 A1 | 12/2001 | Phippen et al. | |
| 2001/0056504 A1 | 12/2001 | Kuznetsov | |
| 2002/0042757 A1 * | 4/2002 | Albazz et al. | 705/26 |
| 2002/0049790 A1 * | 4/2002 | Ricker et al. | 707/513 |
| 2002/0083099 A1 | 6/2002 | Knauss et al. | |
| 2002/0103715 A1 | 8/2002 | Bennett et al. | |
| 2002/0111964 A1 * | 8/2002 | Chen et al. | 707/513 |
| 2002/0152175 A1 | 10/2002 | Armstrong et al. | |
| 2002/0178103 A1 | 11/2002 | Dan et al. | |
| 2003/0018666 A1 | 1/2003 | Chen et al. | |
| 2003/0101184 A1 * | 5/2003 | Chiu et al. | 707/10 |
| 2003/0121001 A1 | 6/2003 | Jeannette et al. | |
| 2003/0130845 A1 | 7/2003 | Poplawski | |
| 2003/0140048 A1 | 7/2003 | Meier et al. | |
| 2003/0149934 A1 | 8/2003 | Worden | |
| 2003/0154404 A1 | 8/2003 | Beadles et al. | |
| 2003/0158854 A1 | 8/2003 | Yoshida et al. | |
| 2003/0167446 A1 | 9/2003 | Thomas | |
| 2003/0182452 A1 | 9/2003 | Upton | |
| 2003/0233420 A1 | 12/2003 | Stark et al. | |
| 2004/0010753 A1 | 1/2004 | Salter et al. | |
| 2004/0107213 A1 | 6/2004 | Zubeldia et al. | |
| 2004/0153968 A1 | 8/2004 | Ching et al. | |
| 2004/0177094 A1 | 9/2004 | Jacobs et al. | |
| 2004/0193435 A1 | 9/2004 | Fang | |
| 2004/0205592 A1 | 10/2004 | Huang | |
| 2005/0004885 A1 * | 1/2005 | Pandian et al. | 707/1 |
| 2005/0038816 A1 | 2/2005 | Easton | |
| 2005/0055631 A1 | 3/2005 | Scardina et al. | |
| 2005/0060317 A1 | 3/2005 | Lott et al. | |
| 2005/0063387 A1 | 3/2005 | Chen et al. | |
| 2005/0071344 A1 | 3/2005 | Chen et al. | |
| 2005/0114405 A1 | 5/2005 | Lo | |
| 2005/0131933 A1 | 6/2005 | Jha | |
| 2005/0132276 A1 | 6/2005 | Panditharadhya et al. | |
| 2005/0138648 A1 | 6/2005 | Ahmed et al. | |
| 2005/0150944 A1 | 7/2005 | Melick et al. | |
| 2005/0187973 A1 | 8/2005 | Brychell et al. | |
| 2005/0246415 A1 | 11/2005 | Belfiore et al. | |
| 2005/0256892 A1 | 11/2005 | Harken | |
| 2005/0256965 A1 * | 11/2005 | Hohmann et al. | 709/230 |
| 2005/0262130 A1 * | 11/2005 | Mohan | 707/102 |
| 2005/0278345 A1 * | 12/2005 | Andra et al. | 707/100 |
| 2006/0036522 A1 | 2/2006 | Perham | |
| 2007/0005786 A1 | 1/2007 | Kumar et al. | |
| 2007/0022375 A1 | 1/2007 | Walker | |
| 2007/0112579 A1 | 5/2007 | Ratnakaran et al. | |
| 2007/0145138 A1 | 6/2007 | Snyder et al. | |
| 2007/0220051 A1 | 9/2007 | Brentano et al. | |

FOREIGN PATENT DOCUMENTS

| | | |
|---|---|---|
| WO | 0133369 A1 | 5/2001 |
| WO | 0155895 A2 | 8/2001 |
| WO | 03021901 A2 | 3/2003 |

OTHER PUBLICATIONS

Unknown, "Content Management Technology/Industry News, The Gilbane Report," http://gilbane.com/contentmanagement news.pl/2000/11/content management/news.html, Nov. 29, 2000, 30 pages Bluebill Advisors, Inc.

Kuramitsu Kimio et al, "Distributed Object-Oriented Schema to Share XML-based Catalogs among Business," Proceedings of the first International Conference on Web Information Systems Engineering, pp. 81-90, Jun. 2000, also available at http://xml.coverpages.org/kiki-wise2000.html, 16 pages, IEEE Press, USA.

Liu, Youzhong et al, "A Rule Warehouse System for Knowledge Sharing and Business Collaboration," UF CISE TR01-006A, http://www.cise.ufl.edu/tech reports/tr01/tr01-006.pdf, 2001, 67 pages, Database Systems R&D Center, University of Florida, FL.

Unknown, "CAM: Content Assembly Mechanism—business transaction information management," http://www.oasis-open.org/committees/download.php/5929/CAM%20Technical%20brochure%2003Mar04.pdf, printed on Feb. 23, 2006, 7 pages, Oasis, USA.

Unknown, "EDI Tools," Stylus Studio, http://www.stylusstudio.com/edi/, printed on Jan. 2, 2006, 3 pages, Progress Software Corporation, USA.

Unknown, "OBOE—Open Business Objects for EDI An EDI and XML Software Developer's Toolkit," http://www.americancoders.com/OpenBusinessObjects/overview.html, updated on Oct. 31, 2005, 5 pages, Version 3.3.4, American Coders, Ltd., USA.

Unknown, "XML GUI Mapper with EDI Authoring Tools," http://www.redix.com/dtd13.htm, printed on Jan. 2, 2006, 4 pages, Redix International, Inc., USA.

Hinkelman, Scott, "Business Integration—Information Conformance Statements (BI-ICS)—An XML specification for declaring business information conformance", http://www-128.ibm.com/developerworks/xml/library/x-biics/, updated on Oct. 12, 2005, 4 pages, IBM, USA.

Unknown, "iWay Software 5.5: New Enhancements," http://www.iwaysoftware.com/products/iWay55_features.html, printed on Dec. 27, 2005, 3 pages, iWay Software, USA.

Van De Putte, Geert, et al, "Implementing EDI Solution," Oct. 2003, IBM Redbook, 244 pages.

Adams et al., "BizTalk Unleashed", Feb. 8, 2002, Sams, 54 selected pages.

"HIPAA Transaction Sets and Code Sets (HTSCS) 270 / 271 Companion Guide Specifications", Mar. 30, 2004, South Carolina Department of Health and Human Services, Version 1.1, [internet] http://www.scdhhshipaa.org, 38 pages.

* cited by examiner

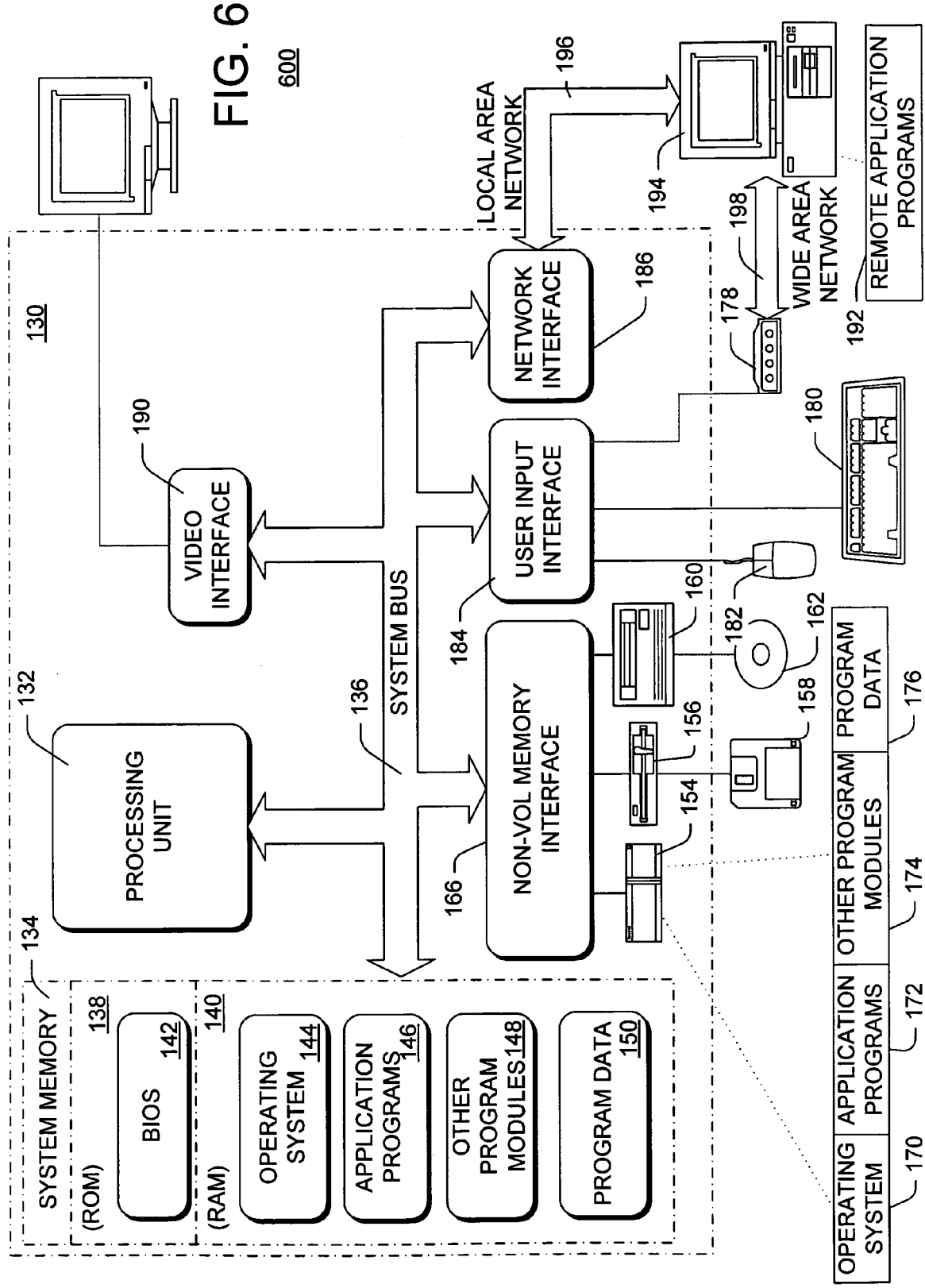

XML PAYLOAD SPECIFICATION FOR MODELING EDI SCHEMAS

BACKGROUND

Electronic data interchange (EDI) is one of the ways businesses use for exchanging computer-to-computer business information based on approved formatting standards and schemas. For example, millions of companies around the world transmit data associated with business transactions (e.g., purchase orders, shipping/air bills, invoices, or the like) using EDI to conduct commerce.

In a typical EDI transaction model, a large business entity or an EDI integration broker trades with numerous partners and has the technical capability to handle numerous EDI transaction data in various EDI formats and schemas. These entities, also known as "hubs," transact with one or more suppliers, also known as "spokes". Each of the spokes typically is a relatively small business entity that is only capable of dealing with one hub.

Before the spokes attempt to initiate transactions via EDI with the hub, the hub typically transmits various EDI schemas to the spokes so that the spokes may properly format the EDI transactions according to the EDI schemas. Currently, EDI schemas are large in size and the file size for each EDI schema typically ranges from 1 MB to 3 MB. In addition, the hub or large trading partners customarily transmit a large amount of schemas to the spokes, without taking into considerations of the spokes' lack of hardware capability. As such, thousands of such schemas, which may occupy several Gigabytes in bandwidth during transmission, are transmitted from the hub to the spokes.

In addition to transmitting a large amount of schemas which consume the spokes' transmission bandwidth, related systems or techniques define EDI schemas using a linear or flat file-based to represent EDI schemas. These types or models of representation, while having a simple composition, do not have the full capability to represent additional and sometimes have critical information associated with EDI schemas. As such, the spokes and the hub alike may not maximize the full benefit of the convenience of EDI transactions.

SUMMARY

Embodiments of the invention enhance the previous approaches and practices of representing EDI schemas by describing a structured EDI documents using eXtensible Markup Language (XML) configurations. By modeling an EDI payload as XML payload during runtime, embodiments of the invention reduce the time in developing schemas and transformation maps. In addition, alternative embodiments generate annotations in the XML EDI schemas including information associated with a plurality of validation rules that exists in the EDI data.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 6 is a block diagram illustrating one example of a suitable computing system environment in which the invention may be implemented.

Corresponding reference characters indicate corresponding parts throughout the drawings.

DETAILED DESCRIPTION

Figure 1:
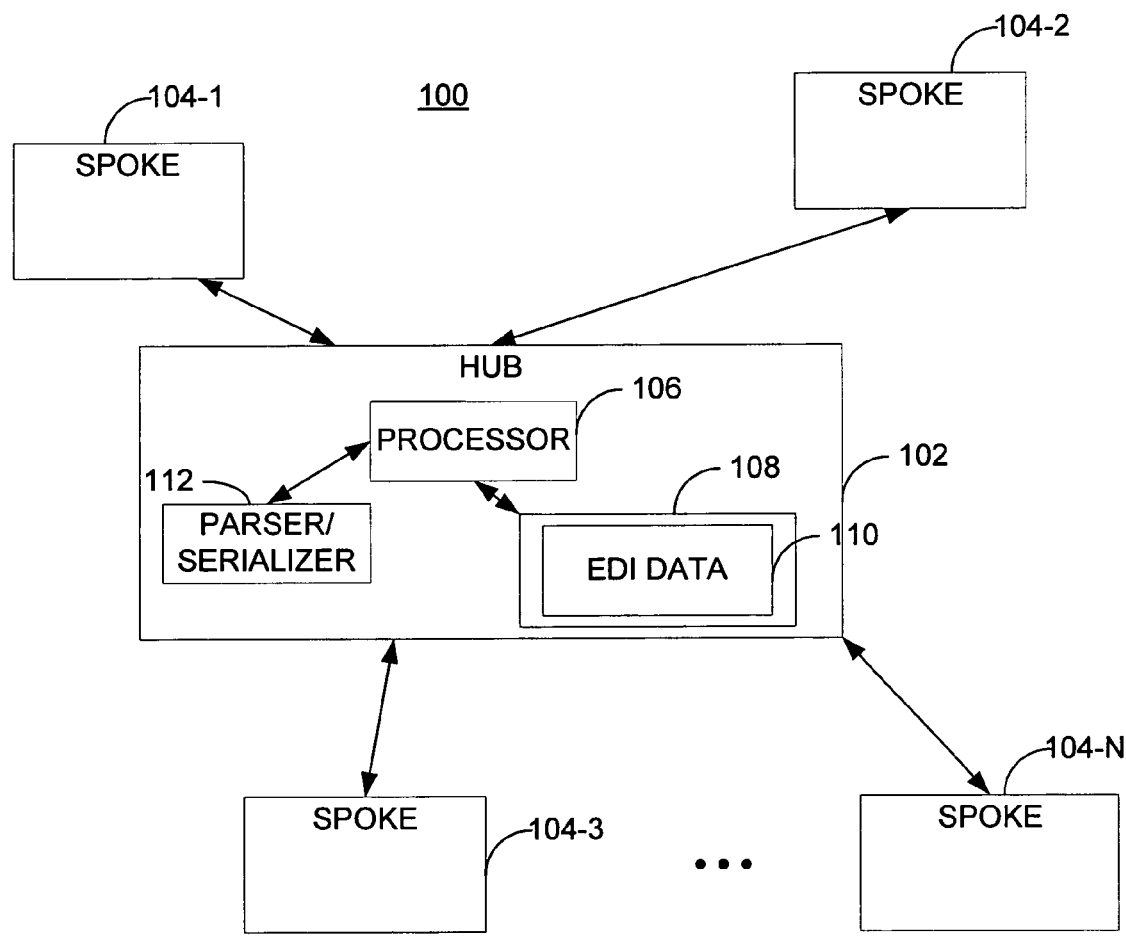
FIG. 1 is a block diagram illustrating a system for conducting electronic data interchange (EDI) transactions according to an embodiment of the invention.

Referring first to FIG. 1, a block diagram illustrates a system 100 for conducting electronic data interchange (EDI) transactions according to an embodiment of the invention. The system 100 includes a hub 102 linked to and communicating with one or more spokes 104. In one embodiment, the hub 102 includes a server computer or a computing device serving one or more processors (e.g., processor 106) or processing units for executing computer-executable instructions for serving the spokes 104. In one example, the spokes 104 include a computing device having one or more components included in or coupled with a computer 130, as shown in FIG. 6.

In one example, the hub 102 also includes a memory area 108 for storing one or more EDI schemas, such as an EDI schema 110. Initially, the hub 102 and the spokes 104 establish agreements as to the EDI formats or standards to be used for transmitting transaction data therebetween. Once the parties determine the particular EDI formats or standards to use, the hub 102 selects the appropriate EDI schemas to be transmitted to the spokes 104. In another example, the hub 102 may choose to select all EDI schemas for all types of transactions, such as purchase orders, bills of lading, invoices, payrolls, or the like, to the spokes 104. Although the communications between the hub 102 and the spokes 104 can be a private or public communications network, a wired or wireless network, the spokes 104 typically lack the hardware resources to handle large amount of EDI schemas sent from the hub 102. In addition, the type and bandwidth of computing network communications for the spokes 104 are not equipped to handle such demand imposed by the thousands of EDI schemas, which can reach several Gigabytes in data size.

Figure 2:
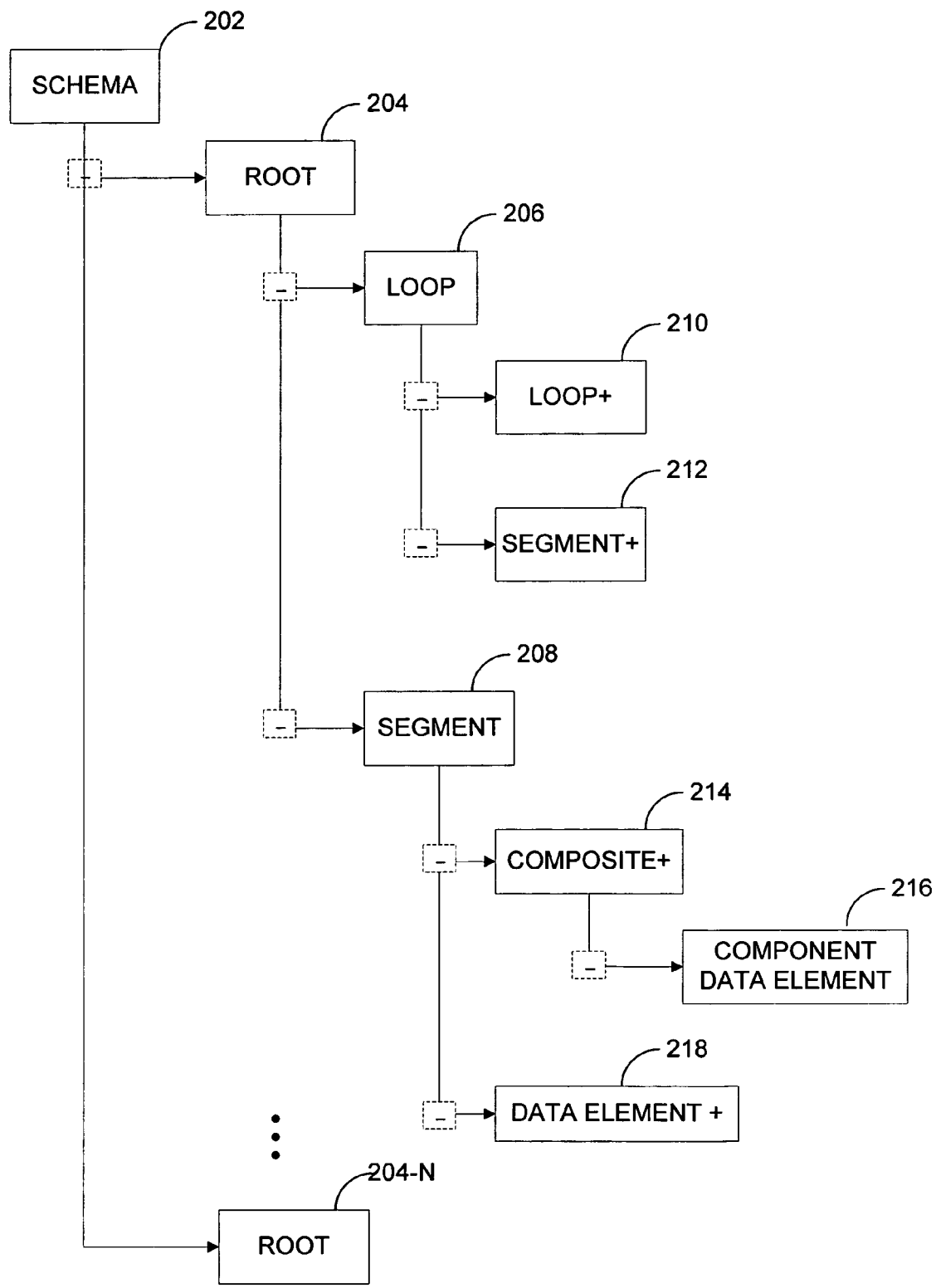
FIG. 2 is a block diagram illustrating a structured EDI schema using XML according to an embodiment of the invention.

Referring now to FIG. 2, a block diagram illustrates a structured EDI schema using XML according to an embodiment of the invention. As discussed above, related practices would represent EDI schema using a simplified, linear, or flat configuration. Table 1 illustrates three EDI transactions in a structured EDI schema embodying aspects of the invention in the left column and the corresponding three transactions in the traditional EDI representation:

TABLE 1

Three EDI transactions in a structure (left column) and in three EDI documents (right column)

| EDI transactions in a Structure | Flat EDI transactions |
|---|---|
| BeginOfTransaction#1 | BeginOfTransaction#1a |
| POHeaderSegment | POHeaderSegment |
| POLine1 | POLine1 |
|    POSchedule1.1 | POSchedule1.1 |
|    POSchedule1.2 | POLine1Totals |

TABLE 1-continued

Three EDI transactions in a structure (left column)
and in three EDI documents (right column)

| EDI transactions in a Structure | Flat EDI transactions |
|---|---|
| POLineTotals | POTotals |
| POLine2 | EndOfTransaction#1a |
| POSchedule2.1 | |
| POLine2Totals | BeginOfTransaction#1b |
| POTotals | POHeaderSegment |
| EndOfTransaction#1 | POLine1 |
| | POSchedule1.2 |
| | POLine1Totals |
| | POTotals |
| | EndOfTransaction#1b |
| | BeginOfTransaction#1c |
| | POHeaderSegment |
| | POLine2 |
| | POSchedule2.1 |
| | POLine2Totals |
| | POTotals |
| | EndOfTransaction#1c |

As illustrated, the flat EDI schema uses more characters and thus occupies more data size than a structured EDI schema in the left column. In one embodiment, the structure of EDI schemas is represented using XML which enables faster processing during runtime and easy configuring, editing, and modifying by users using known XML editing tools.

In one example, an EDI schema is identified by a DocType, which may include a combination of namespace and root node name. In one example, DocType is defined as TargetNamespace '#' RootNodeName. In the example where X12 standard is used, X12 schemas use the following format:

X12 Schemas=X12_{Version}_{TsId}, which indicates that:

1). all X12 schemas have a root node name that starts with X12;

2). "Version" represents the version information of the document, and it is a dynamic piece of information which is configuration or instance driven; and 3). "TsId" stands for "transaction ID" of the document being processed and is always read from the input instance.

As another example, another well-known standard, EDIFACT, includes the following format for representing the EDIFACT schemas:

EDIFACT Schemas=Efact_{Version}_{Tsid}, which indicates that:

1). all EDIFACT schemas have root node name that starts with Efact;

2). "Version" represents the version information of the document, and it is a dynamic piece of information which is configuration or instance driven; and 3). "TsId" stands for "transaction ID" of the document being processed and is always read from the input instance.

As shown in FIG. 2, an EDI schema 202 in a structural overview may include one or more root nodes 204. Each root node 204 includes a sequence of loops 206 and segments 208 as children. Loops 206 may include one or more nested sub-loops 210 or sub-segments 212.

Similarly, the segment 208 may include one or more component data elements 214 and data elements 216. In one embodiment, an XML payload schema representing an EDI schema may possess the following structure:

1. Schema->RootNode

2. RootNode->(Block)+

3. Block->Segment|Loop

4. Loop->(Block)+

5. Segment->(DataElement)+, RuleSet

6. DataElement->SimpleField|CompositeField

7. SimpleField->data

8. CompositeField->(data)+

9. RuleSet->(Rule)+|BlankRuleSet

10. Rule->PairedRule|RequiredRule|ExclusionRule|ConditionalRule|ListRule.

In one embodiment, in modeling the EDI schemas using XML, a plurality of schema rules are applied to configure the XML schema. For example, the plurality of rules may include:

1. One or more elements (e.g., loop, segment, or the like) are at each level with no attributes.

2. Every ComplexType would use 'sequence' compositor. In one example, the ComplexType is a construct for modeling hierarchical data entities. Each ComplexType may use "sequence", "choice" or "any" compositor to group its children, and each compositor may be used according to the following:

a) Sequence—the children should occur in a specific order within an XML instance b) Choice—only one of the children can appear in an XML instance c) Any—children can appear in any order in an XML instance In one embodiment, an EDI schema uses only the sequence compositor. In an alternative embodiment, "choice" and "any" compositor would not be used. The ComplexType may only be included elements as children.

3. Starting from the root node of the document, any element that includes substring "Loop" would be considered a Loop element. Otherwise, it would be considered a segment (see additional discussion below).

4. Once a segment has been identified, substrings of the segment will not be identified.

5. Segments can have children and grand-children in the structured XML schema. For example, only descendants at distance 1 and 2 from the segment node would be permitted as part of the structure.

6. One or more annotations are generated to represent the rules in the EDI schemas. For example, the annotations may be used to represent one or more of the following:

a) Cross field validation rules;

b) Trigger field information, to be used with schemas associated with compliance with Health Insurance Portability and Accountability Act (HIPAA);

c) Reference designator;

d) Split point information rules. For example, the split point information indicates information when the EDI schema or EDI transactions satisfying requirements of EDI schemas have split into multiple sub-documents.

Figure 3:
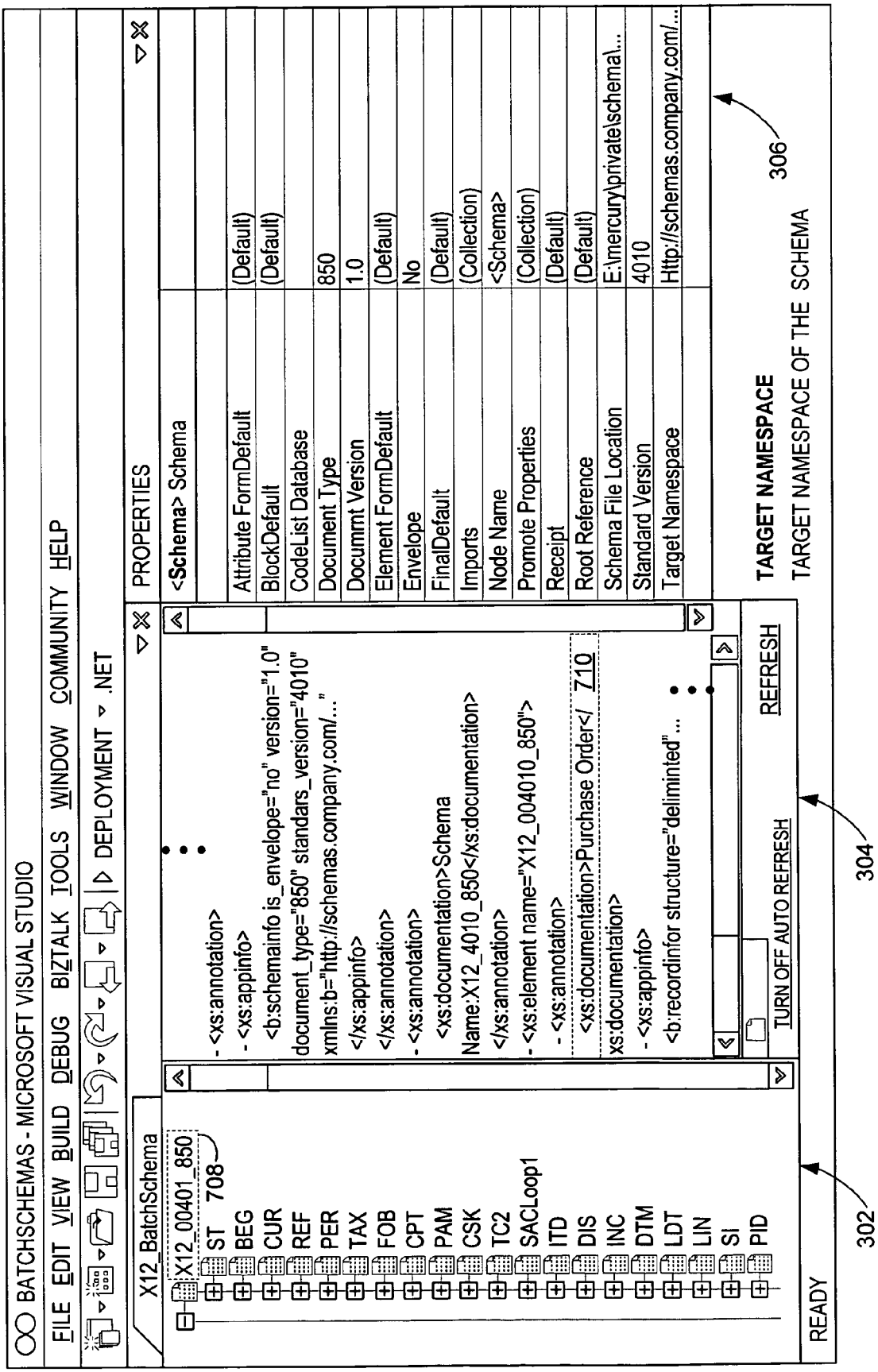
FIG. 3 is a diagram illustrating a XML schema embodying aspects of the invention.

In one embodiment, the XML schema is structured using one or more two- or three-character tags. FIG. 3 is a diagram illustrating a XML schema embodying aspects of the invention. For example, a panel 302 illustrates one or more two- or three-character tags. For example, tags include "ST", "BEG", "CUR".

In one embodiment, based on the name of the segment element, the first three characters may be considered as a tagId. In an alternative embodiment, if the third character of the three-character tag is a "_" character, the segment ID would only be the first two characters. In addition, if one of the two characters includes a "-" character, a compilation error would occur. For instance:

a) "BEG_BeginTransaction" means the Segment ID is BEG;

b) "N1_850Segment" means the Segment ID is N1;

c) "N_abc" means a invalid segment;

d) "N1_Loop" means this is a loop and not a segment; and e) "N_Loop" means this is not an invalid segment but a loop.

In another embodiment, one or more special rules may apply to a set of segment tags. For example, tags such as "ISA", "IEA", etc. have special significance and they are called control segments. Similarly, tags such as "ST" and "SE" are both control and data segments. The list below provides an exemplary set of control segment tags:

ISA
GS
ST
SE
GE
IEA
UNOA
UNB
UNG
UNH
UNT
UNE
UNZ

In another example, embodiments of the invention enhance the functionality of EDI schemas by accounting for one or more rules using annotations. For example, in handling one or more cross field validation rules, rules are expressed as annotations at segment level nodes. Every segment includes an optional list of rules, which are also known as RuleSet. For example, a panel 304 illustrates one or more annotation tags in a structured XML schema. As an illustration, a set of exemplary rules are described in the following paragraphs:

Paired/Multiple—(all, absent)—Either all subject names are present or absent. For example:

```
<b:Rule subjects="X12ConditionDesignatorX_Paired ">
    <b:Subject name="@CUR11" />
    <b:Subject name="@CUR12" />
</b:Rule>
```

Required—(grouped, absent)—At least one of the subjects is required:

```
<b:Rule subjects="X12ConditionDesignatorX_Required ">
    <b:Subject name="@CUR11" />
    <b:Subject name="@CUR12" />
</b:Rule>
```

Exclusion—(any, absent)—Only one subject can be present:

```
<b:Rule subjects="X12ConditionDesignatorX_Exclusion ">
    <b:Subject name="@CUR11" />
    <b:Subject name="@CUR12" />
</b:Rule>
```

Conditional—(all, value)—If qualifier present, all subjects are required:

```
<b:Rule subjects="X12ConditionDesignatorX_Conditional"
    qualifier="@CUR05">
    <b:Subject name="@CUR11" />
    <b:Subject name="@CUR12" />
</b:Rule>
```

List—(any, value)—If qualifier present, at least one subject is required:

```
<b:Rule subjects="X12ConditionDesignatorX_ListConditional"
    qualifier="@CUR05">
    <b:Subject name="@CUR11" />
    <b:Subject name="@CUR12" />
</b:Rule>
```

Unlike previous representation or model of EDI schemas, embodiments of the invention provide a rich set of information for describing rules associated with EDI schemas using XML.

As illustrated above, each rule has a "subject" attribute, an optional qualifier attribute, and a list of subject elements. For example, each of the rules is defined based on values of (subjects, qualifier) pairs:

In one embodiment, the operands of a rule are data elements found within a segment. In this embodiment, during the rule evaluation, a specific value of an operand is not needed. Rather, what is needed is the information whether the data element was valued or not. Using the system 100 in FIG. 1 as an example, during parsing or serialization by a parser/serializer 112, on encountering a segment, the parser/serializer 112 may keep track of the data elements that had a non-blank value. After segment processing is over, the parser/serializer 112 may be able to evaluate all rule operands and hence execute the RuleSet. In the situation where errors occurred in processing the rule operands, one or more error codes are issued. As an example, an exemplary set of suitable error codes is described below corresponding to particular rule violations:

Error code 2—Conditional required data element missing—This would be reported when a Conditional rule is violated. The reported field number would be the one that is the first one (in the order defined in rule) which is absent.

Error code 10—Exclusion condition violated—This would be reported when an Exclusion rule is violated. The reported field number would be the first one (in the order defined in rule) that makes at least 2 fields valued.

Error code 14—(BTS-EDI specific)—Cross field validation rule violated—This error would be raised for all other kinds of rules and would be raised under the following circumstances:

a) Paired rule—The reported field number would be the one that is the first one which is absent;

b) Required rule—This can be violated only if all subjects are absent. In this type of scenario, the first field mentioned in the rule would be reported as having caused the violation;

c) List rule—This can be violated when qualifier is present and all subjects are absent. In such case, the first field mentioned in the rule would be reported as having caused the violation.

Also, in modeling the EDI schemas, embodiments of the invention proper consider the various data types include in EDI schemas. As an example, one or more data types in X12 format are described below:

A. X12 data types:

X12 defines a number of data types. Such types would be recognized by parser/serializer. They would have the capability to validate such types and perform any necessary transformation. However, a document schema can have any kind of simple type associated with it. If it is not an Edi data type, it would be validated codes, routings, computer-executable instructions, such as XmlValidatingReader, depending on schema validation flag being turned on or not.

1. "N"—This is an integer data type with an optional length restriction. A simple element of this type, should have a simple type that is a restriction on a type with local name "N". And "N" is essentially an xs:string.

```
<xs:element minOccurs="0" name="ITD07">
    <xs:simpleType>
        <xs:restriction base="N"/>
            <xs:minLength value="1" />
            <xs:maxLength value="5" />
    </xs:simpleType>
</xs:element>
```

2. "Nn"—This is an integer type with an implied decimal point, specified by n>0. So if Type is N2—then parser would convert 1234 to 12.34. Likewise, 12.34 would be converted to 1234 by the serializer. If the decimal point is not encountered or length restriction is not followed, an appropriate Edi error code would be raised. A simple element of this type, should have a simple type that is a restriction on a type with local name "N2", for instance. And "N2" is essentially an xs:string.

```
<xs:element minOccurs="0" name="ITD08">
    <xs:simpleType>
        <xs:restriction base="N2"/>
            <xs:minLength value="4" />
            <xs:maxLength value="8" />
    </xs:simpleType>
</xs:element>
```

3. "ID"—This is an enumeration data type with optional length restrictions. A simple element of this type, should have a simple type that is a restriction on a type with local name "ID". And "ID" is essentially an xs:string. If the list of enumeration is empty, any data value would be allowed.

```
<xs:element minOccurs="0" name="ITD09">
    <xs:simpleType>
        <xs:restriction base="ID"/>
```

-continued

```
            <xs:enumeration value="00" />
            <xs:enumeration value="10" />
    </xs:simpleType>
</xs:element>
```

4. "AN"—This is an alphanumeric data type with length restrictions. A simple element of this type, should have a simple type that is a restriction on a type with local name "AN". And "AN" is essentially an xs:string.

```
<xs:element minOccurs="0" name="ITD09">
    <xs:simpleType>
        <xs:restriction base="AN"/>
            <xs:minLength value="1" />
            <xs:maxLength value="5" />
    </xs:simpleType>
</xs:element>
```

5. "R"—This is a real number. A simple element of this type, should have a simple type that is with local name "R". And "R" has the format [sign]integral-digits[.[fractional-digits]] where Sign—can only be −, + would not be accepted

```
<xs:element minOccurs="0" name="ITD09">
    <xs:simpleType>
        <xs:restriction base="R"/>
            <xs:minLength value="1" />
            <xs:maxLength value="5" />
    </xs:simpleType>
</xs:element>
```

6. "Date"—This is a date data type. A simple element of this type should have a simple type with local name "date". The format is CCYYMMDD.

7. "Time"—A simple element of this type should have a simple type with local name "time". The format is HHMM[[SS][d[d]]].

B. EDIFACT Data Type:

Similarly, in describing schemas in EDIFACT format, an EDIFACT schema defines a number of data types such as one of the following:

1. "a"—This is an alphabetic data type with a length restriction. A simple element of this type, should have a simple type that is a restriction on a type with local name "a". And "a" is essentially an xs:string.<xs:element minOccurs="0" name="ITD07">

```
    <xs:simpleType>
        <xs:restriction base="a"/>
            <xs:minLength value="1" />
            <xs:maxLength value="5" />
    </xs:simpleType>
</xs:element>
```

2. "n"—This is a numeric data type with length restriction. A simple element of this type, should have a simple type that is a restriction on a type with local name "n", for instance. And "n" is essentially an xs:string.

```
<xs:element minOccurs="0" name="ITD08">
    <xs:simpleType>
        <xs:restriction base="n"/>
            <xs:minLength value="4" />
            <xs:maxLength value="8" />
        </xs:simpleType>
</xs:element>
```

3. "ID"—This is an enumeration data type with optional length restrictions. A simple element of this type, should have a simple type that is a restriction on a type with local name "ID". And "ID" is essentially an xs:string. If the list of enumeration is empty, any data value would be allowed. For EDIFACT data which comes in 949 code page, Enum values in the schema would be their Unicode equivalent.

```
<xs:element minOccurs="0" name="ITD09">
    <xs:simpleType>
        <xs:restriction base="ID">
            <xs:enumeration value="00" />
            <xs:enumeration value="10" />
        </xs:simpleType>
</xs:element>
```

4. "AN"—This is an alphanumeric data type with length restrictions. A simple element of this type, should have a simple type that is a restriction on a type with local name "AN". And "AN" is essentially an xs:string.

```
<xs:element minOccurs="0" name="ITD09">
    <xs:simpleType>
        <xs:restriction base="AN"/>
            <xs:minLength value="1" />
            <xs:maxLength value="5" />
        </xs:simpleType>
</xs:element>
```

As discussed previously, one of the rules annotated by the XML schema embodying aspects of the invention is reference designators. The reference designators exist at field level and they refer to a number in 'metadata-dictionary' which can be used during error debugging. Engine would report this information during parsing at AK502 level. For example, it would report the designator value if present in the schema. The following annotation is used at field level. AK502 is an optional field, if annotation is not present, it would not be valued. The following exemplary XML statements illustrate an example of reference designator:

```
<xs:annotation>
    <xs:appinfo>
        <b:fieldInfo edi_reference_designator="725"
        xmlns:b="http://schemas.company.com/software/2003" />
    </xs:appinfo>
</xs:annotation>
```

Similarly, one of the rules, the trigger field information, is annotated according to an embodiment of the invention. This annotation may exist at a loop or segment level to identify the field inside a segment that serves as a trigger field. And also the value that should result in a trigger transition. This information is used in HIPAA schemas to generate more user friendly Xml. The annotation is as shown below: In this example, the TS270A1_2100A_Loop is a trigger loop. The trigger segment may be written in XML as: NM1_InformationSourceName_TS270A1_2100A and the trigger field is NM101_EntityIdentifierCode. The trigger value could be any of: 2B; 36; GP; P5; or PR. The following illustrates the exemplary XML statement or code:

```
- <xs:element name="TS270A1_2100A_Loop">
- <xs:annotation>
    <xs:appinfo>
<b:recordInfo
trigger_field="NM1_InformationSourceName_TS270A1_2100A/NM101_EntityIdentifierC
ode" trigger_value="2B 36 GP P5 PR/>
    </xs:appinfo>
</xs:annotation>
```

Figure 4:
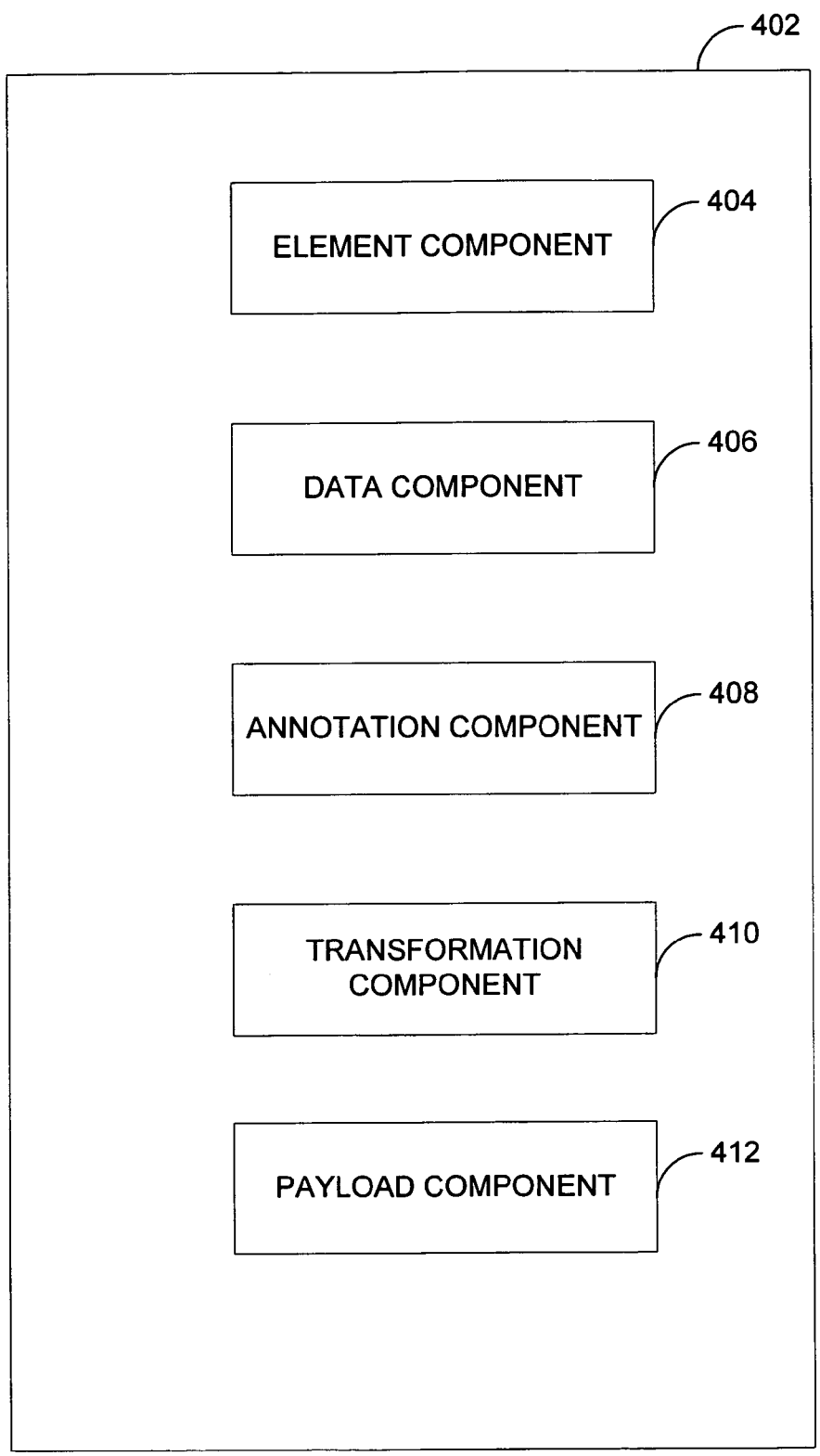
FIG. 4 is a block diagram illustrating an exemplary computer-readable medium on which aspects of the invention may be stored.

FIG. 4 is a block diagram illustrating an exemplary computer-readable medium 502 on which aspects of the invention may be stored. For example, the computer-readable medium 402 includes one or more computer-executable components for performing operations illustrated in FIG. 5, which is a flow chart describing operations of modeling an electronic data interchange (EDI) document using extensible Markup Language (XML) at runtime according to an embodiment of the invention.

For example, an element component 404 identifies a plurality of structural elements in the EDI document at 502. At 504, a data component 406 determines a plurality of corresponding data values from the identified plurality of structural elements in the EDI document. At 506, an annotation component 408 generates annotations for a plurality of rules included in the EDI document. The plurality of rules defines operations associated with the plurality of corresponding data values. A transformation component 410 modifies or transforms the determined data values and the generated annotated into an XML schema corresponding to the EDI document at 508. At 510, a payload component 512 processes the XML schema at runtime.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

Figure 5:
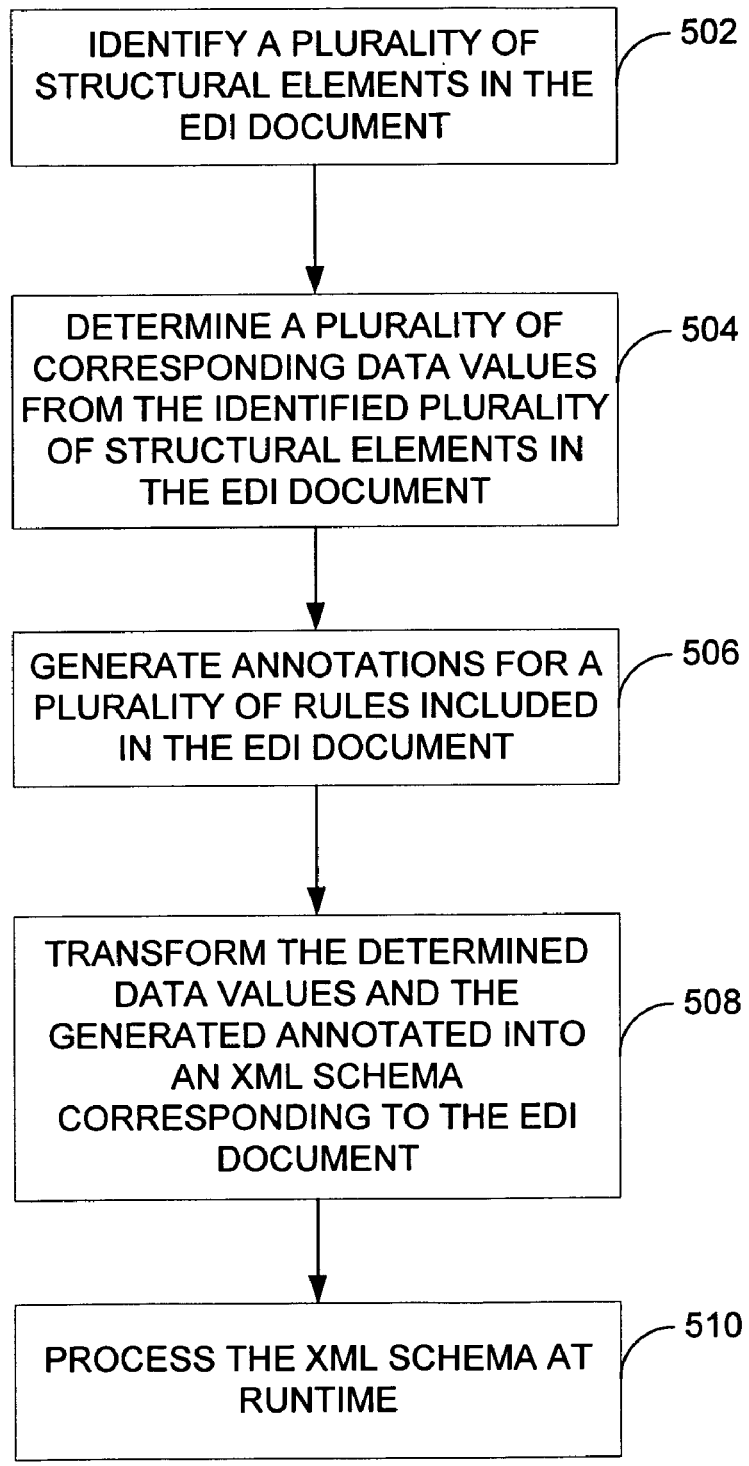
FIG. 5 is an exemplary flow chart illustrating operations of modeling an EDI document using eXtensible Markup Language (XML) at runtime.

In operation, computer 130 executes computer-executable instructions such as those illustrated in the figures, such as FIG. 5, to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for modeling an electronic data interchange (EDI) document using eXtensible Markup Language (XML) at runtime, said method comprising:

identifying a plurality of structural elements in the EDI document, said identified plurality of structural elements representing at least one transaction, said identified plurality of structural elements being defined by at least one EDI schema included in the EDI document, said EDI document having an original format associated with an EDI standard, a version of the EDI standard, and a transaction set of the EDI standard;

identifying common elements in the plurality of identified structure elements;

determining a plurality of corresponding data values from the identified plurality of structural elements in the EDI document;

without receiving input from a user to identify the EDI standard, the version of the EDI standard, and the transaction set of the EDI standard, generating a structured EDI schema representing the at least one EDI schema as a function of the identified plurality of structural elements and the plurality of determined data values, said generated structure EDI schema converting the original format based on the identified common elements;

identifying one or more rules included in the EDI document, said one or more identified rules comprising at least one of the following: one or more cross field validation rules, one or more trigger field information rules, one or more reference designator rules, one or more split point information rules, and an list of rules of a segment structural element, wherein the one or more identified rules are associated with the plurality of corresponding data values;

generating XML annotations based on the one or more identified rules for defining relationships between the determined data values for an XML schema;

transforming the determined data values and the generated XML annotations into the XML schema corresponding to the EDI document and the structured EDI schema; and processing the XML schema at runtime such that the plurality of rules represented in the generated XML annotations are applied at runtime to the determined values.

2. The method of claim 1, wherein identifying comprises identifying one or more loops and one or more segments included in the plurality of structural elements.

3. The method of claim 2, further comprising identifying one or more sub-segments associated with the one or more of the identified segments.

4. The method of claim 1, further comprising configuring the XML schema according a plurality of schema rules for defining a structure of the determined data values.

5. The method of claim 1, wherein generating annotations comprises generating the annotations including one or more attributes for the plurality of rules.

6. A system for modeling an electronic data interchange (EDI) document using eXtensible Markup Language (XML) at runtime, said system comprising:

a processor executing computer-executable instructions for:

identifying a plurality of structural elements in the EDI document, said identified plurality of structural elements representing at least one transaction, said identified plurality of structural elements being defined by at least one EDI schema included in the EDI document, said EDI document having an original format associated with an EDI standard, a version of the EDI standard, and a transaction set of the EDI standard;

identifying common elements in the plurality of identified structure elements;

determining a plurality of corresponding data values from the identified plurality of structural elements in the EDI document;

without receiving input from a user to identify the EDI standard, the version of the EDI standard, and the transaction set of the EDI standard, generating a structured EDI schema representing the at least one EDI schema as a function of the identified plurality of structural elements, the plurality of determined data values, said generated structure EDI schema converting the original format based on the identified common elements;

identifying one or more rules included in the EDI document, said one or more identified rules comprising at least one of the following: one or more cross field validation rules, one or more trigger field information rules, one or more reference designator rules, one or more split point information rules, and a list of rules of a segment structural element, wherein the one or more identified rules are associated with the plurality of corresponding data values;

generating XML annotations based on the one or more identified rules;

modifying the determined data values and the generated XML annotations into an XML schema corresponding to the EDI document and the structured EDI schema; and processing the XML schema such that the plurality of rules represented in the generated XML annotations are applied at runtime to the determined values.

7. The system of claim 6, further comprising a parser for parsing the plurality of data values in the identified plurality of structural elements.

8. The system of claim 6, wherein the processor is configured to identify one or more loops and one or more segments included in the plurality of structural elements.

9. The system of claim 8, wherein the processor is further configured to identify one or more sub-segments associated with the one or more of the identified segments.

10. The system of claim 6, wherein the processor is configured to generate the annotations for the plurality of rules, said plurality of rules defining one or more of the following: trigger field information, reference designator, and split point information.

11. The system of claim 6, wherein the processor is further configured to define the XML schema according a plurality of schema rules for defining a structure of the determined data values.

12. The system of claim 6, wherein the processor is configured to generate the annotations including one or more attributes for the plurality of rules.

13. One or more computer storage media having computer-executable components for modeling an electronic data interchange (EDI) document using eXtensible Markup Language (XML) at runtime, said computer-executable components comprising:

an element component for identifying a plurality of structural elements in the EDI document, said identified plurality of structural elements representing at least one transaction, said identified plurality of structural elements being defined by at least one EDI schema included in the EDI document, said EDI document having an original format associated with an EDI standard, a version of the EDI standard, and a transaction set of the EDI standard;

a data component for determining a plurality of corresponding data values from the identified plurality of structural elements in the EDI document;

wherein said element component identifies common elements in the plurality of identified structure elements, wherein said element component, without receiving input from a user to identify the EDI standard, the version of the EDI standard, and the transaction set of the EDI standard, generates a structured EDI schema representing the at least one EDI schema as a function of the identified plurality of structural elements, the plurality of determined data values, said generated structure EDI schema converting the original format based on the identified common elements;

an annotation component for identifying one or more rules included in the EDI document, said one or more identified rules comprising at least one of the following: one or more cross field validation rules, one or more trigger field information rules, one or more reference designator rules, one or more split point information rules, and a list of rules of a segment structural element, wherein the one or more identified rules are associated with the plurality of corresponding data values, said annotation component generating XML annotations based on the one or more identified rules;

a transformation component for transforming the determined data values and the generated XML annotations into an XML schema corresponding to the EDI document and the structured EDI schema; and a payload component for processing the XML schema at runtime such that the plurality of rules represented in the generated XML annotations are applied at runtime to the determined values.

14. The computer storage media of claim 13, wherein the element component identifies one or more loops and one or more segments included in the plurality of structural elements.

15. The computer storage media of claim 14, wherein the element component further identifies one or more sub-segments associated with the one or more of the identified segments.

16. The computer storage media of claim 13, wherein the annotation component generates the annotations for the plurality of rules, said plurality of rules defining one or more of the following: trigger field information, reference designator, and split point information.

17. The computer storage media of claim 13, wherein the transformation component further defining the XML schema according a plurality of schema rules for defining a structure of the determined data values.

18. The computer storage media of claim 13, wherein the annotation component generates the annotations including one or more attributes for the plurality of rules.

* * * * *